(12) United States Patent
Crutchfield et al.

(10) Patent No.: US 10,102,601 B2
(45) Date of Patent: Oct. 16, 2018

(54) EMBEDDING DIGITAL CONTENT WITHIN A DIGITAL PHOTOGRAPH DURING CAPTURE OF THE DIGITAL PHOTOGRAPH

(71) Applicant: PixMarx The Spot, LLC, Austin, TX (US)

(72) Inventors: Barry Crutchfield, Austin, TX (US); Gary Lipps, Mandeville, LA (US)

(73) Assignee: PixMarx The Spot, LLC, Austin, TX (US)

( * ) Notice: Subject to any disclaimer, the term of this patent is extended or adjusted under 35 U.S.C. 154(b) by 0 days.

(21) Appl. No.: 15/705,703

(22) Filed: Sep. 15, 2017

(65) Prior Publication Data

US 2018/0068411 A1    Mar. 8, 2018

Related U.S. Application Data

(63) Continuation of application No. 15/275,166, filed on Sep. 23, 2016, now Pat. No. 9,792,662, which is a
(Continued)

(51) Int. Cl.
*G06K 9/00* (2006.01)
*G06T 1/00* (2006.01)
(Continued)

(52) U.S. Cl.
CPC ........ *G06T 1/0021* (2013.01); *G06F 17/3028* (2013.01); *G06F 17/30265* (2013.01);
(Continued)

(58) Field of Classification Search
None
See application file for complete search history.

(56) References Cited

U.S. PATENT DOCUMENTS 6,023,231 A     2/2000  Tsunoda
9,459,778 B2   10/2016  Hogeg et al.
(Continued)

FOREIGN PATENT DOCUMENTS

EP           1420366 A2    5/2004

*Primary Examiner* — Weiwen Yang
(74) *Attorney, Agent, or Firm* — Hunt Pennington Kumar & Dula PLLC

(57) ABSTRACT

A wireless communication device comprises position determining system, a digital imaging system and a photograph customization system coupled to the position locating system and the digital imaging system. The position determining system is configured to provide information indicating a current position of the wireless communication device. The digital imaging system is configured to create digitally rendered images of visual content acquired thereby. The visual content is displayed on an image viewing structure of the digital imaging device while being acquired. The photograph customization system is configured to use the current location of the digital imaging device for providing one or more embeddable content images and to display information from at least one of the one or more embeddable content images on an image viewing structure of the digital imaging device while the visual content being acquired by the digital imaging system is being displayed on the image viewing structure.

16 Claims, 13 Drawing Sheets

Related U.S. Application Data continuation of application No. 14/251,707, filed on Apr. 14, 2014, now Pat. No. 9,477,689.

(60) Provisional application No. 61/966,161, filed on Feb. 15, 2014.

(51) Int. Cl.
*G06F 17/30* (2006.01)
*H04N 5/77* (2006.01)
*H04N 5/913* (2006.01)

(52) U.S. Cl.
CPC ............... *H04N 5/77* (2013.01); *H04N 5/772* (2013.01); *H04N 5/913* (2013.01); *G06T 2201/0064* (2013.01); *H04N 2005/91335* (2013.01)

(56) References Cited

U.S. PATENT DOCUMENTS

| | | |
|---|---|---|
| 2003/0020816 A1 | 1/2003 | Hunter et al. |
| 2005/0169499 A1* | 8/2005 | Rodriguez .............. G01S 19/14 382/100 |
| 2008/0014917 A1* | 1/2008 | Rhoads ................... G06F 3/017 455/422.1 |
| 2008/0198409 A1 | 8/2008 | Bodin et al. |
| 2011/0173565 A1 | 7/2011 | Ofek et al. |
| 2012/0023457 A1 | 1/2012 | Lai et al. |
| 2012/0069051 A1 | 3/2012 | Hagbi et al. |
| 2012/0304052 A1 | 11/2012 | Tanaka et al. |
| 2013/0307842 A1 | 11/2013 | Grinberg et al. |
| 2014/0049614 A1* | 2/2014 | Yamada ............... H04N 5/2226 348/46 |
| 2015/0154779 A1* | 6/2015 | Kelley .................... G06T 11/60 382/154 |

* cited by examiner

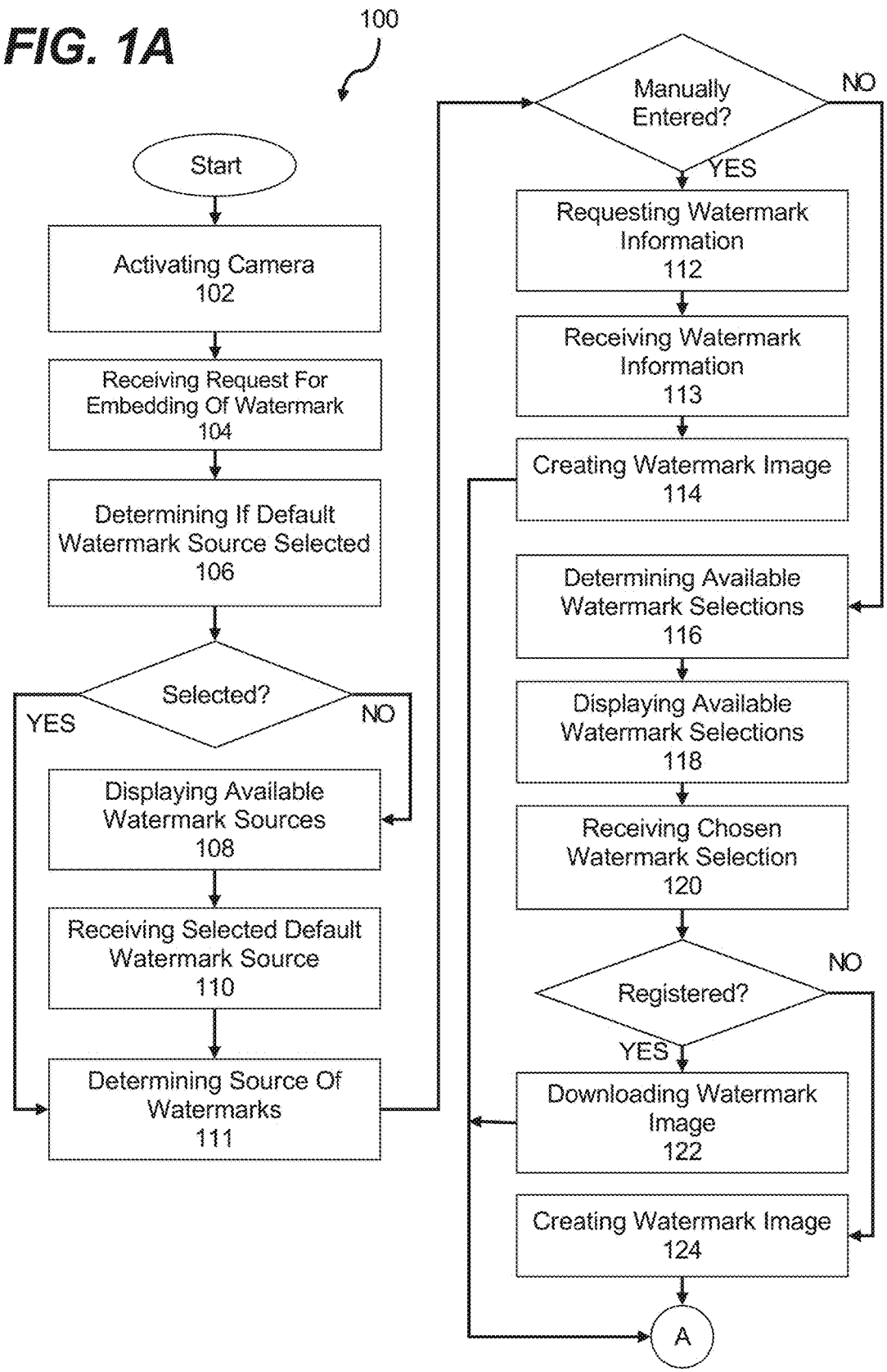

EMBEDDING DIGITAL CONTENT WITHIN A DIGITAL PHOTOGRAPH DURING CAPTURE OF THE DIGITAL PHOTOGRAPH

CROSS REFERENCE TO RELATED APPLICATIONS

This continuation patent application claims priority from U.S. Non-provisional patent application Ser. No. 15/275,166, filed 23 Sep. 2016, entitled "Embedding Digital Content Within a Digital Photograph During Capture of the Digital Photograph", which is expressly incorporated by reference in its entirety. This application is related to, and claims priority from, U.S. Non-provisional patent application Ser. No. 14/251,707, filed 14 Apr. 2014, entitled "Embedding digital content within a digital photograph during capture of the digital photograph", which is expressly incorporated by reference in its entirety. This application is related to, and claims priority from, U.S. Provisional Application Ser. No. 61/966,161, filed 15 Feb. 2014, entitled "Embedding digital content within a digital photograph during capture of the digital photograph", which is expressly incorporated by reference in its entirety.

United States Non-provisional Patent Application having Ser. No. 14/251,707, filed 14, Apr. 2014, entitled "Embedding digital content within a digital photograph during capture of the digital photograph" claims priority from Provisional Patent Application having Ser. No. 61/966,161, filed 15, Feb. 2014, entitled "Viewfinder watermark technique is a new WYSIWYG (What You See Is What You Get) method for embedding an electronic digital watermark/image within a users live camera lens/window viewer whether the lens is a digital screen or eyepiece. This method occurs prior to the user taking a photo. In addition, this method would be internal to the device process whether it was on a camera or smart phone or hand held device. When user snaps/takes photo, what was seen in the live viewer with embedded image becomes the same image in a digital photo's output file; therefore, when comparing what was seen in the camera viewer with the digital photo file or printed photo, the result is WYSIWYG (What You See Is What You Get)", both of which have a common applicant herewith and are being incorporated herein in their entirety by reference.

FIELD OF THE DISCLOSURE

The disclosures made herein relate generally to digital photography solutions and, more particularly, to embedding digital content within a digital photograph during capture of the digital photograph.

BACKGROUND

Digital photography, like traditional film photography, is widely used for memorializing events and moments. With the advent of social media and wireless communication, it has become common place for people to use digital photographs as an integral part of their social networking endeavors such as through posting of pictures on their on-line social network page. This is due in no small part to the inclusion of digital cameras in wireless communication devices (e.g., smartphones, tablets, etc) and the affordability of digital cameras. As such, ever increasing numbers of people are now taking photographs as a routine part of their daily lives whether it be for personal enjoyment and entertainment, to share with friends and family, or both.

Unlike traditional film photography, digital photography offers the ability to immediately view, edit and share photographs. This being the case, people have an expectation that their digital imaging solution offer them various approaches for enhancing their digital photographs though contextualization (e.g., editing a label into the photograph after it is taken) and/or customization (e.g., editing a border, special effect, etc into the photograph after it is taken). However, these post-capture approaches for enhancing their digital photographs often contribute to photos not being shared or added to an album because one or more separate process must performed after taking the photograph to achieve such contextualization and/or customization. Therefore, enabling such contextualization and/or customization to be performed in combination with taking a photograph is advantageous, desirable and useful.

SUMMARY OF THE DISCLOSURE

Embodiments of the present invention are directed to a system-implemented solution (e.g., an internal process of a digital imaging device) for enabling personalization (e.g., via contextualization and/or customization) to be performed in combination with taking a photograph with a digital imaging device. A digital camera, a smartphone camera, and a tablet are examples of a digital imaging device that can be configured in accordance with an embodiment of the present invention. More specifically, embodiments of the present invention are directed to displaying an embedded digital image (e.g., an electronic digital icon (e.g., watermark), picture, text, or the like) within an image viewing structure (e.g., eyepiece, visual display, or the like) of a digital imaging device prior to and during a photograph being taken using the digital imaging device. Accordingly, when a user of such a digital imaging device takes the photograph, as-viewed visual content seen within the image viewing structure (i.e., the embedded digital image overlaid on to-be-photographed visual content) is the same as what would be a corresponding outputted digital file of the imaging device. In this regard, the corresponding outputted digital file is a 'What You See Is What You Get (WYSIWYG)' representation of the as-viewed visual content within the image viewing structure of the imaging device when the to-be-photographed visual content is captured by the digital imaging device. Advantageously, the embedded digital image can be selected based on an actual location of the digital imaging device at the time when the to-be-photographed visual content is captured using the digital imaging device (i.e., the current location of the digital imaging device).

In one embodiment of the present invention, a computer-implemented method comprises a plurality of operations. An operation is performed for receiving a request to embed system-provided content into a photograph to be taken using a digital imaging device. An operation is performed for providing, dependent upon a current location of the digital imaging device when the request is received, one or more embeddable images. An operation is performed for displaying, on an image viewing structure of the digital imaging device, the one or more embeddable content images in combination with visual content being viewed by the digital imaging device.

In another embodiment of the present invention, a wireless communication device comprises position determining system, a digital imaging system and a photograph customization system coupled to the position locating system and the digital imaging system. The position determining system is configured to provide information indicating a current position of the wireless communication device. The digital imaging system is configured to create digitally rendered images of visual content acquired thereby. The visual content is displayed on an image viewing structure of the digital imaging device while being acquired. The photograph customization system is configured to use the current location of the digital imaging device for providing one or more embeddable content images and to display information from at least one of the one or more embeddable content images on an image viewing structure of the digital imaging device while the visual content being acquired by the digital imaging system is being displayed on the image viewing structure.

In another embodiment of the present invention, a non-transitory computer-readable medium has tangibly embodied thereon and accessible therefrom processor-executable instructions that, when executed by at least one data processing device of at least one computer, causes the at least one data processing device to perform a method for generating a photo. Generating the photo comprises a plurality of operations. An operation of receiving a request to embed system-provided content into a photograph to be taken using a digital imaging device is performed. An operation of providing one or more embeddable images dependent upon a current location of the digital imaging device when the request is received is performed. An operation of displaying the one or more embeddable content images on an image viewing structure of the digital imaging device in combination with visual content being viewed by the digital imaging device is performed.

These and other objects, embodiments, advantages and/or distinctions of the present invention will become readily apparent upon further review of the following specification, associated drawings and appended claims.

BRIEF DESCRIPTION OF THE DRAWINGS

FIGS. 1A and 1B are a flow diagram showing a system-implemented method configured in accordance with an embodiment of the present invention.

DETAILED DESCRIPTION

Figure 1B:
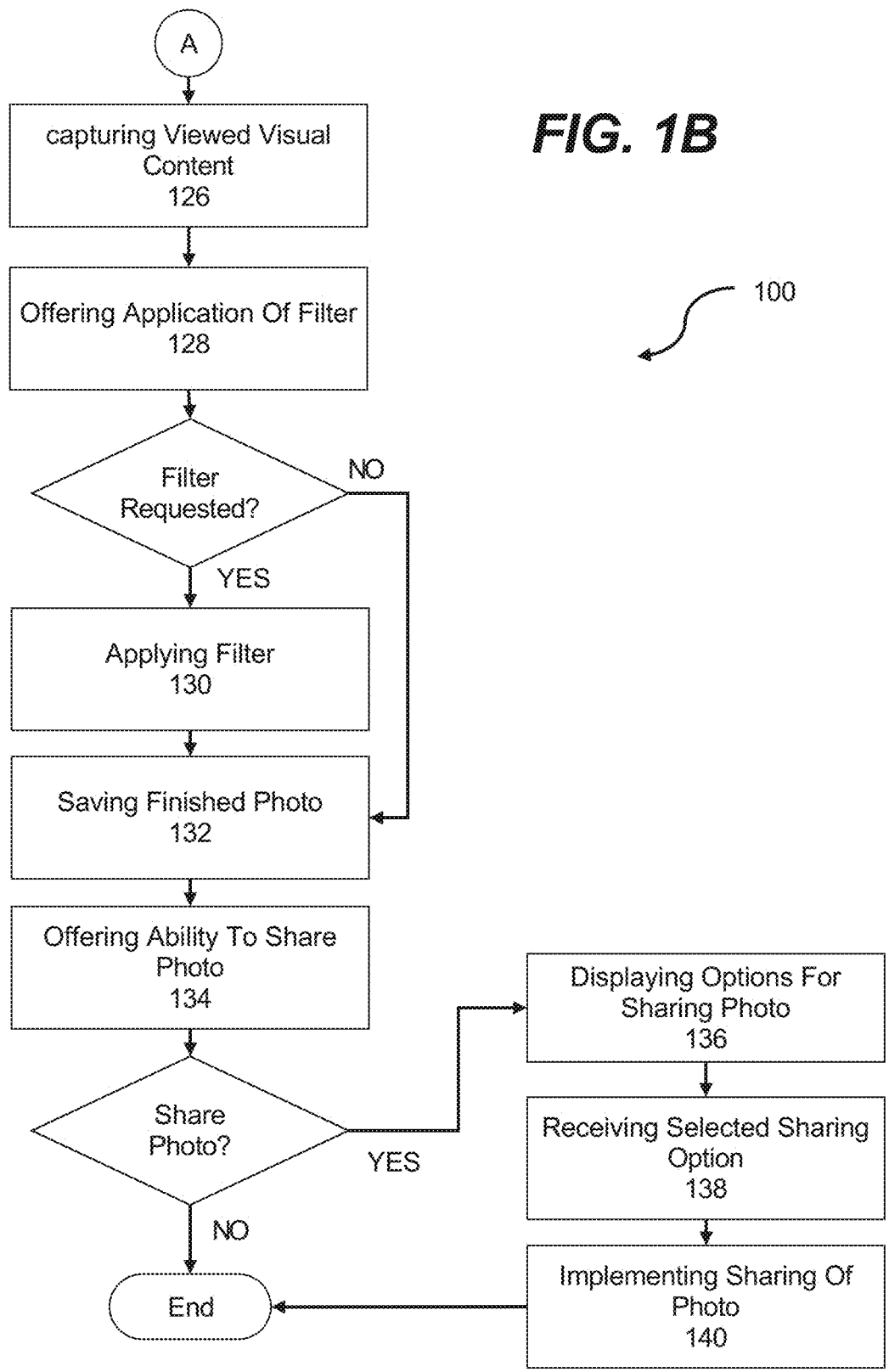

FIGS. 1A and 1B are a flow diagram showing an embodiment of a system-implemented method (i.e., method 100) for embedding digital content within a digital photograph during capture of the digital photograph. It is disclosed herein that the embedded digital content can be that in the form of an icon, a logo, a string of text/numerals, a picture, a photograph, and/or the like (i.e., generally refereed to herein as a watermark). In this regard, embodiments of the present invention are not limited to any particular type of embedding digital content. Furthermore, although the method steps described herein are discussed in a particular order, one of skill in the art will recognize that many method steps can be carried out in a different order and overlap in time without departing from the spirit of this disclosure.

The method 100 of FIG. 1 provides for customization of a photograph through embedding supplemental content (i.e., embedded digital content) into a photograph being taken using the digital imaging device. Advantageously, the embedded digital content is displayed within an image viewing structure (e.g., eyepiece, visual display, or the like) of the digital imaging device prior to and during the photograph being taken thereby ensuring desired framing of the photographed visual content with respect to the embedded digital content. To this end, the embedded digital content is maintained at a static position within an area of the image viewing structure. Accordingly, when the photograph is taken, as-viewed visual content seen within the image viewing structure includes the embedded digital content merged (e.g., overlaid onto) to-be-photographed visual content such that what is seen is the same as what would be a corresponding outputted digital file of the imaging device (i.e. the outputted photograph). Furthermore, the embedded digital content is advantageously selected based on an actual location of the digital imaging device at the time when the to-be-photographed visual content is captured using the digital imaging device.

The method 100 is preferably implemented via an application (or operating system) of a digital imaging device such as, for example, the smartphone 200 shown in FIGS. 2A-2G. A smartphone and similarly capable types of tablets, notepads and cameras are each an example of a data processing system in the context of embodiments of the present invention. An Apple iPhone brand cellular telephone and a cellular phone with an Android brand operating system are examples of smart phones. It is disclosed herein that embodiments of the present invention are not limited to any particular brand, form or configuration of data processing system.

Figure 2A:
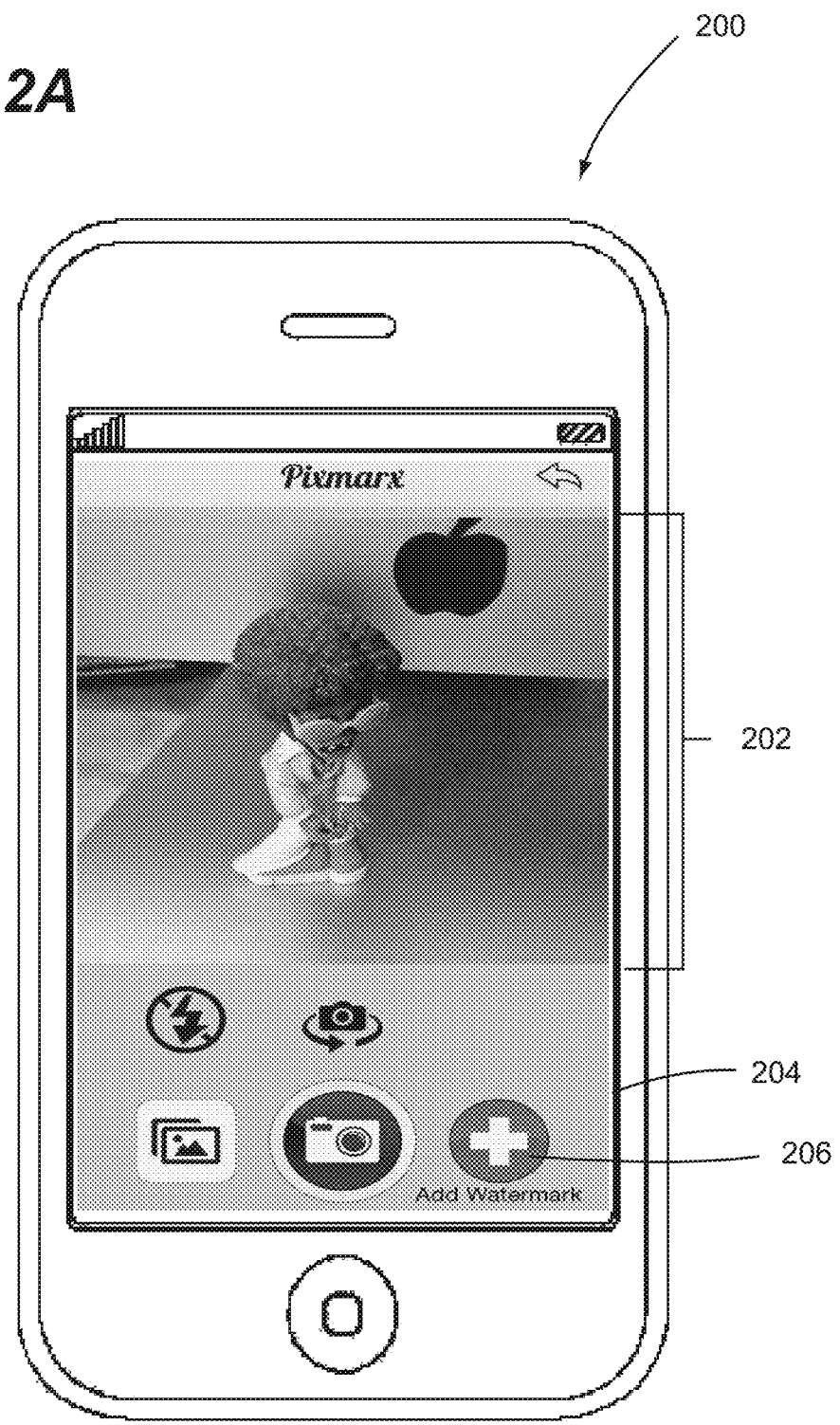
FIGS. 2A-2H are diagrammatic views showing various aspects of a smartphone application configured in accordance with an embodiment of the present invention.

The method 100 begins with an operation 102 for activating a camera (e.g., a digital camera, a camera or a smartphone, a camera of a tablet or the like), followed by an operation 104 for receiving a request for the addition of a watermark (i.e., embedded digital content) to a photo to be taken. As shown in FIG. 2A, the visual content that is being viewed by the camera of the smartphone 200 is displayed within a respective area 202 of a visual display 204 (i.e., image viewing structure) of the smartphone 200. The request for the addition of the watermark to the photograph to be taken can be implemented through the pressing of an 'Add Watermark' button 206.

Figure 2B:
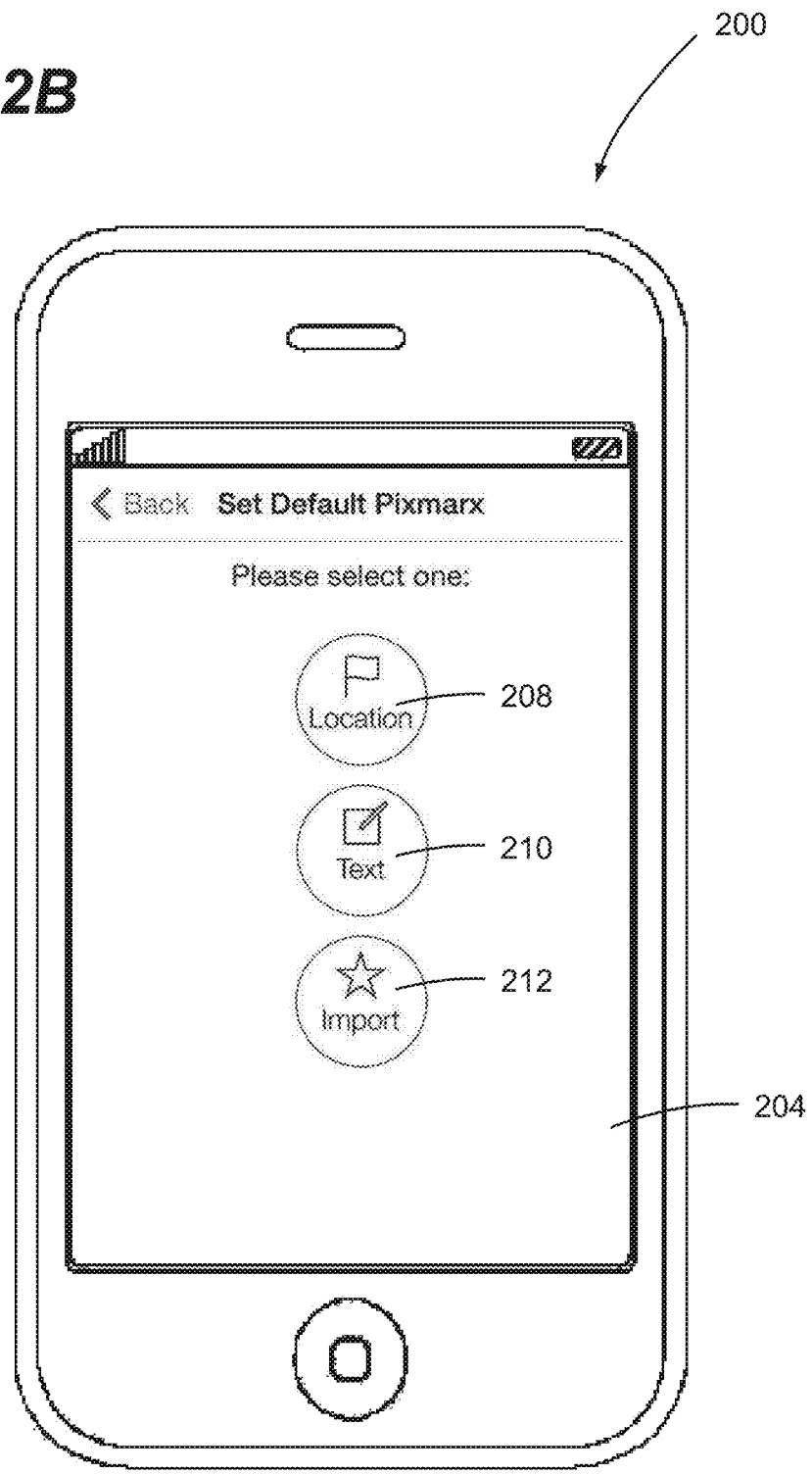

After receiving the request for the addition of the watermark, an operation 106 is performed for determining if a default watermark source has been selected. For example, if not previously selected such as upon an initial implementation of the method 100 on the smartphone 200, the default watermark source may need to be selected from a plurality of available watermark sources. If it is determined that the default watermark source has not been selected, an operation 108 is performed for displaying available watermark sources, followed by an operation 110 being performed for receiving a selected default watermark source. After receiving the default watermark source, or if the default watermark source has already been selected, an operation 111 is performed for determining the source of watermarks (i.e., the default watermark source). As shown in FIG. 2B, selection of a preferred watermark source can include be implemented via the visual display 204 of the smartphone 200 through selection of a button 208 for choosing location-based watermarks (e.g., as determined through use of a global positioning system to determine a current location of the smartphone 200) as the default watermark source, through selection of a button 210 for choosing user-provided textual watermarks (e.g., provided though manual entry of text by a user) as the default watermark source, or through selection of a button 212 for choosing user-imported watermarks as the default watermark source.

Figure 3:
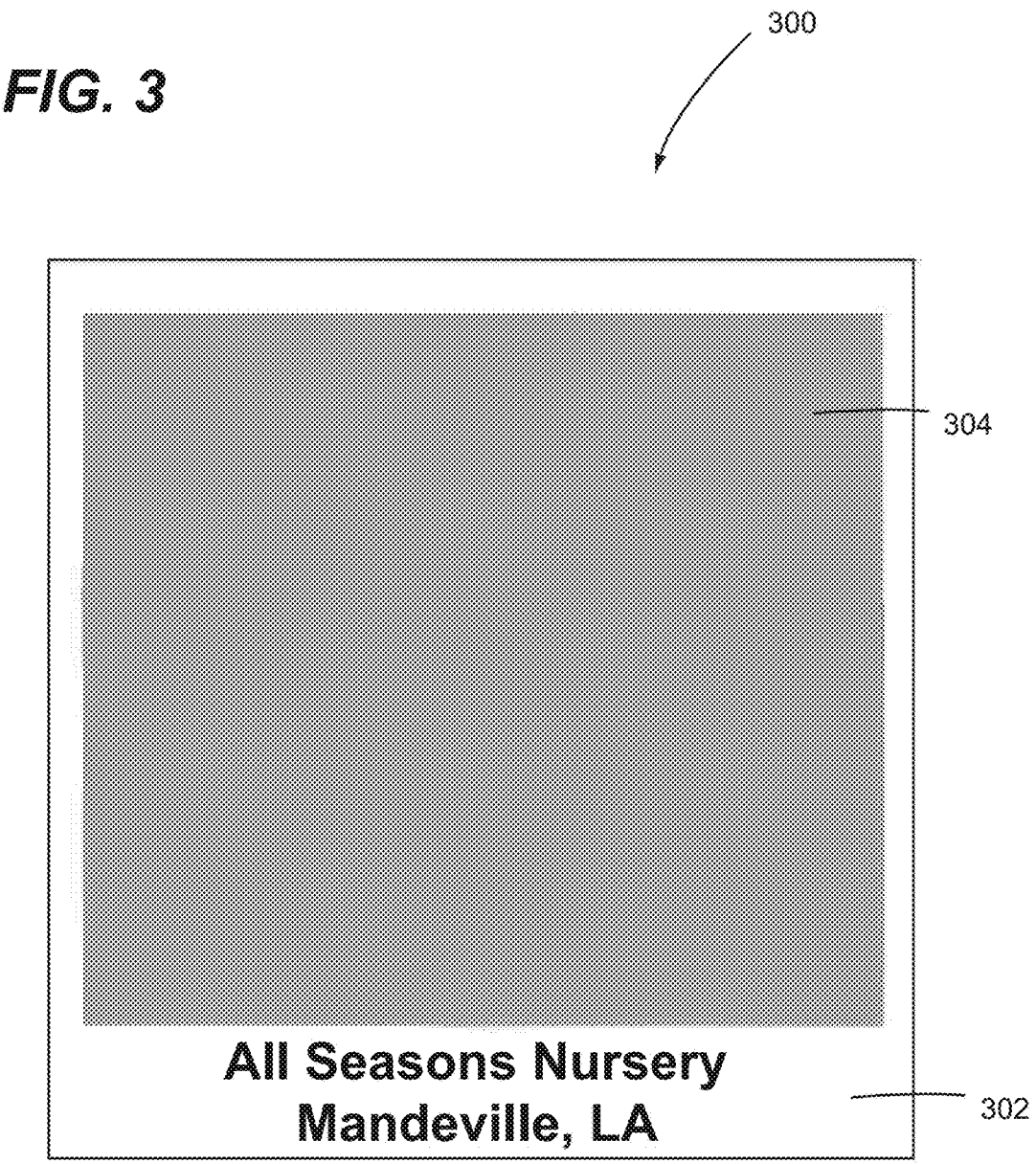
FIG. 3 is a diagrammatic view showing a watermark image configured in accordance with an embodiment of the present invention.

If it is determined that the source of watermarks is manually entered watermark information (e.g., user-provided textual watermarks, user-imported watermark, or the like), an operation 112 is performed for requesting the watermark information (e.g., text or imported watermark file), followed by an operation 113 being preformed for receiving the requested watermark information. Thereafter, an operation 114 is performed for creating the selected watermark image using the received watermark information. For example, if the manually entered watermark information specifies a text string (e.g., All Season Nursery Mandeville, La.), a watermark image is created by instantiating a watermark image template 300 with the watermark information, as shown in FIG. 3. As can be seen, in preferred embodiments, the watermark image template 300 includes an watermark content portion 302 (i.e., an optically opaque portion of the watermark image) in which watermark information is located and a captured image portion 304 (i.e., an optically transparent portion of the watermark image) in which visual content captured by a digital imaging device is located. As discussed below in greater detail, the optically transparent portion of the watermark image allows a portion of an image in a background layer to be visible through the optically transparent portion of the watermark image.

In preferred embodiments of the present invention, the watermark image (e.g., a captured visual content portion thereof) is in exact proportion to exterior dimensions (e.g., aspect ratio) of display area size for visual content being viewed using the digital imaging device. The watermark image is displayed as a foreground image and the visual content being viewed using the digital imaging device is displayed as a background image. The matching proportions of the watermark image to the exterior dimensions of the visual content display area ensure that the watermark image is aligned with a resulting image captured by the digital imaging device (i.e., as-viewed visual content is framed within the optically transparent portion of the watermark image in the same manner as viewed on the visual display when the photo is taken).

If it is determined that the source of watermarks is a location-based watermarks (i.e., not manually entered), an operation 116 is performed for determining available location-based watermark selections. In the context of the present invention, a location-based watermark refers to a watermark associated with a location that is within a prescribed distance from a current location of a digital imaging device performing the method 100. For example, such location can be determined through use of a location service of the digital imaging device. For example, a current location of the phone can be determined by a global positioning functionality of a smartphone, a tablet, a digital camera, or the like).

Location-based watermarks can be registered or unregistered. In the case of registered watermarks, determining the available location-based watermarks includes determining a current location of the digital imaging device and using such location to retrieve available registered watermarks from a database of registered watermarks (e.g., those that are within a prescribed distance from the current location of the digital imaging device). In the case of unregistered watermarks, determining the available location-based watermarks includes determining a current location of the digital imaging device and using such location to retrieve entries from a database of entries (e.g., places/destinations) searchable by their global positioning system coordinates (e.g., those having global positioning system coordinates that are within a prescribed distance from the current location of the digital imaging device).

Figure 2C:
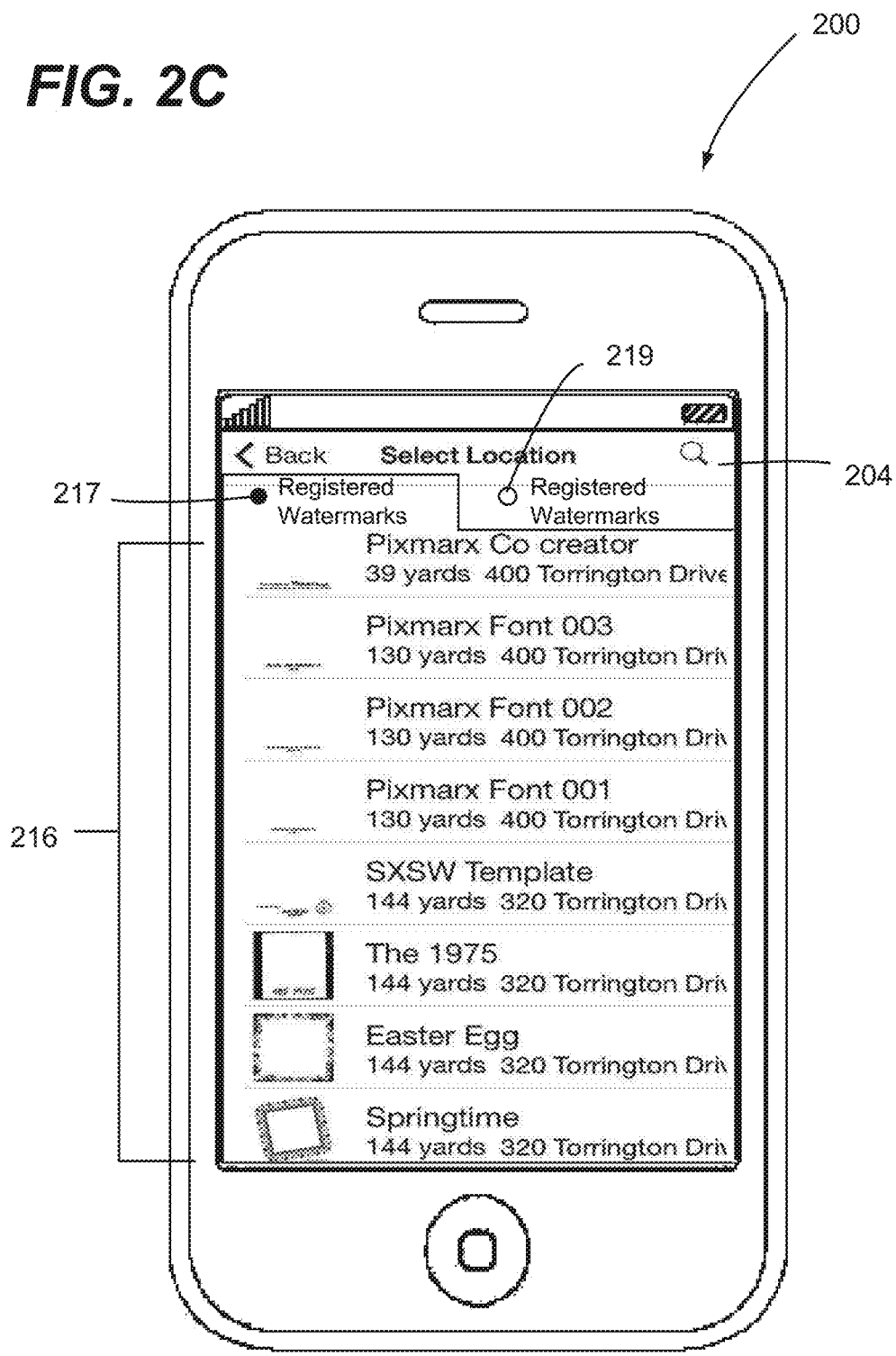
Figure 2D:
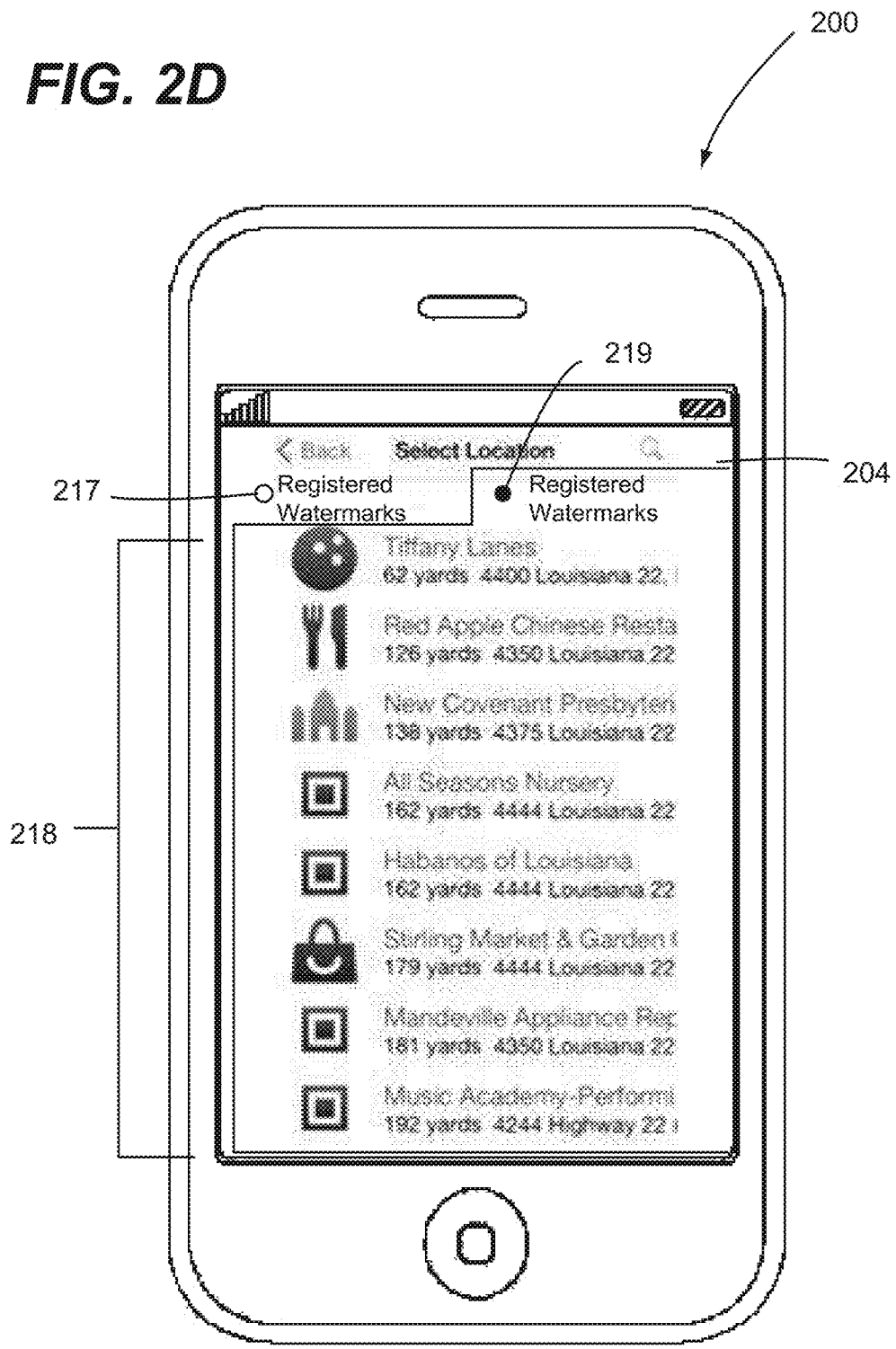
Figure 2E:

After determining the available location-based watermark selections, an operation 118 is performed for displaying the available location-based watermark selections. As shown in FIGS. 2C and 2D, for example, a list of available registered watermarks 216 can be provided on a first location-based watermark page displayed in response to selection of a registered watermarks display button 217 and a list of available unregistered watermarks 218 can be provided on a second location-based watermark page displayed in response to selection of an unregistered watermarks display button 219. It is disclosed herein that additional information can be garnished by each one of the watermark selections. In one example, hovering over a particular one of the watermark selections causes supplemental information about it to be displayed and the particular one of the watermarks is chosen by clicking/tapping on it. In another example, clicking on a particular one of the watermark selections causes supplemental information to be displayed and the particular one of the watermark is chosen by clicking/tapping on a choose this watermark selection' button that is displayed in conjunction with the supplemental information.

Figure 4:
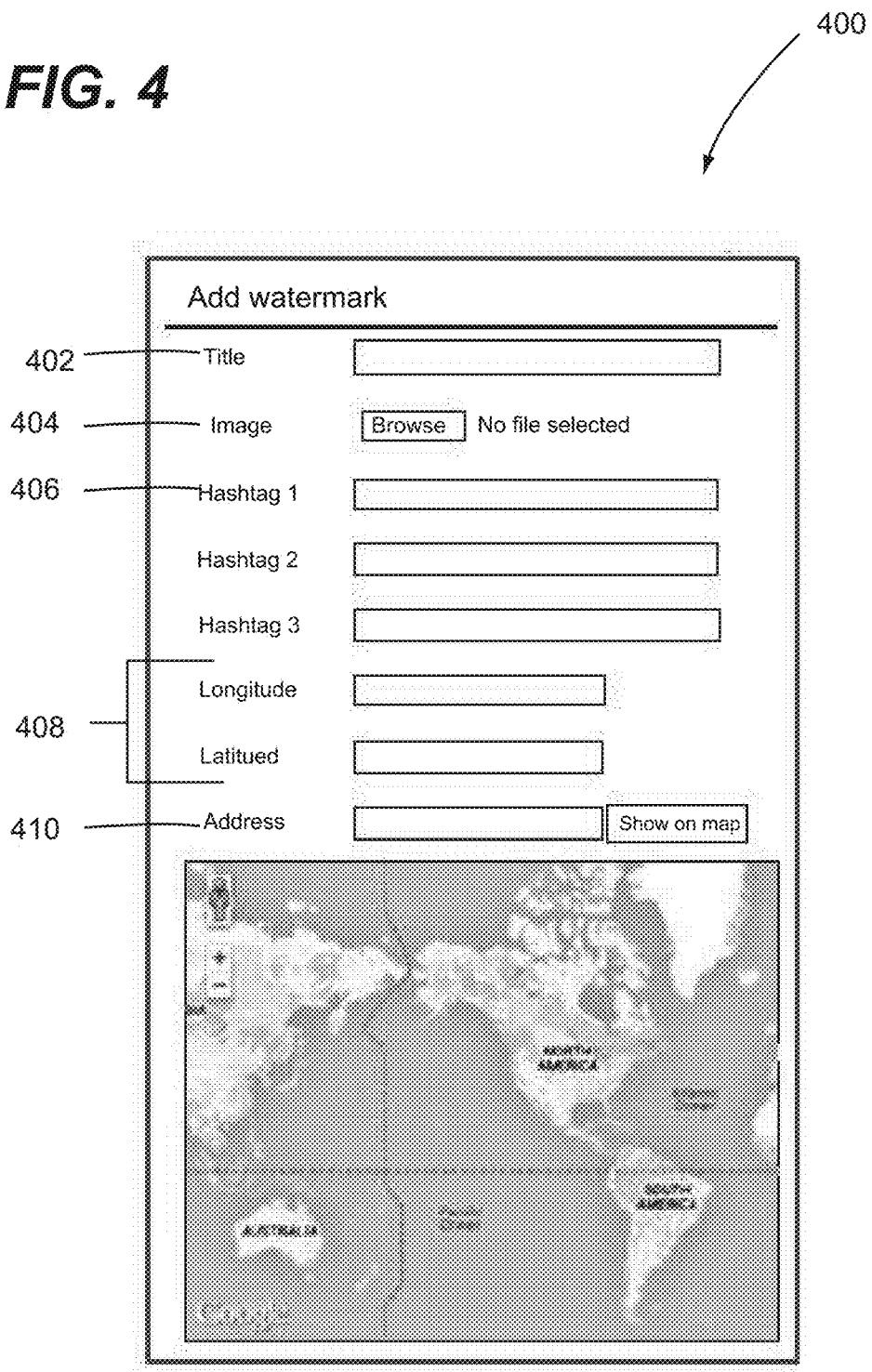
FIG. 4 is a diagrammatic view showing a watermark registration form configured in accordance with an embodiment of the present invention.

In preferred embodiments of the present invention, registered watermarks are maintained in a database of registered watermarks that have respective location defining information associated therewith. For example, as shown in FIG. 4, a watermark registration form 400 enables watermark registration information to be provided to a system that manages registered watermarks (e.g., embedded image management server). Examples of the watermark registration information includes, but is not limited to, a watermark title 402, a watermark image file 404, one or more social media content identifiers 406 (e.g., a hash tag, a handle identifier, or the like), global positioning coordinates 408, and a physical street address 410.

As shown in FIG. 1A, after the available location-based watermark selections are displayed, an operation 120 is performed for receiving a chosen one of the available location-based watermark selections. The chosen one of the available location-based watermark selections can correspond to a registered watermark or to an unregistered watermark. If the chosen one of the available location-based watermark selections corresponds to a registered watermark, an operation 122 is performed for downloading a watermark image (e.g., in the form of a file of digital information) corresponding to the chosen one of the available location-based watermark selections. Otherwise, the chosen one of the available location-based watermark selections corresponds to an unregistered watermark, which results in an operation 124 being performed for creating a watermark image using information associated with the unregistered watermark selection (e.g., name of establishment at associated location, address of location, etc), as discussed above in reference to FIGS. 2D and 3. In preferred embodiments, the watermark image created using the information associated with the unregistered watermark selection can be created in the same manner as discussed above in reference to FIG. 3. In view of the disclosures made herein, a skilled person will appreciate that the watermark selection process discussed above can be implemented a plurality of times for embedding more than one watermark into a photograph (e.g., at different locations of the photograph).

After downloading or creating the watermark image, an operation 126 is performed for capturing viewed visual content (i.e., the captured visual content). Capturing the viewed visual content refers to causing visual content that is currently being viewed by the digital imaging device at a particular instant to be captured as a digital record (e.g., file). For example, capture of visual content being viewed by a camera of the smartphone 200 is performed in response to depressing a shutter button 220. In response to capturing the viewed visual content, a photographic image becomes displayed on the visual display 204 of the smartphone 200. The photographic image comprises the watermark image 224 corresponding to the chosen watermark in combination with the captured visual content 226. For example, the captured visual content becomes displayed within a captured visual content portion (e.g., as shown by the dotted line in FIG. 2E) of a watermark image 224. Advantageously, the watermark image is maintained at a static position within an area of the visual display 204 while the visual content is being viewed and captured (i.e., the visual content being viewed is displayed within the captured visual content portion of the watermark image 224. In the case of a watermark image in a PNG (portable network graphics) file format, once a user selects the chosen one of the watermark image selections, the watermark image is placed as a layer into an active image viewing structure (e.g., camera viewer window) of the digital imaging device. The watermark image is sized to the same dimensions (e.g., aspect ratio) of the as-displayed visual content being viewed by the digital imaging device (e.g., full size of the image viewing structure). Because the watermark image is displayed on the image viewing structure in a foreground layer and the viewed image content is displayed on the image viewing structure in a background layer, it allows a user to see as-viewed visual content in a background layer through the transparent portion of the watermark image. Non-transparent portions of the watermark image (e.g., border area and area having logo(s) text, etc) stay in foreground of the image viewing structure thereby blocking underlying portions of the viewed visual content. This gives user the ability to line up visual content in the image viewing structure with respect to the watermark image. Accordingly, when the photograph is taken, viewed visual content seen within the visual display 204 includes the watermark image 224 merged (e.g., overlaid onto) the to-be-photographed visual content such that what is seen on the visual display 204 at the instant the shutter button 220 is depressed is the same as the resulting outputted photograph.

Figure 2F:
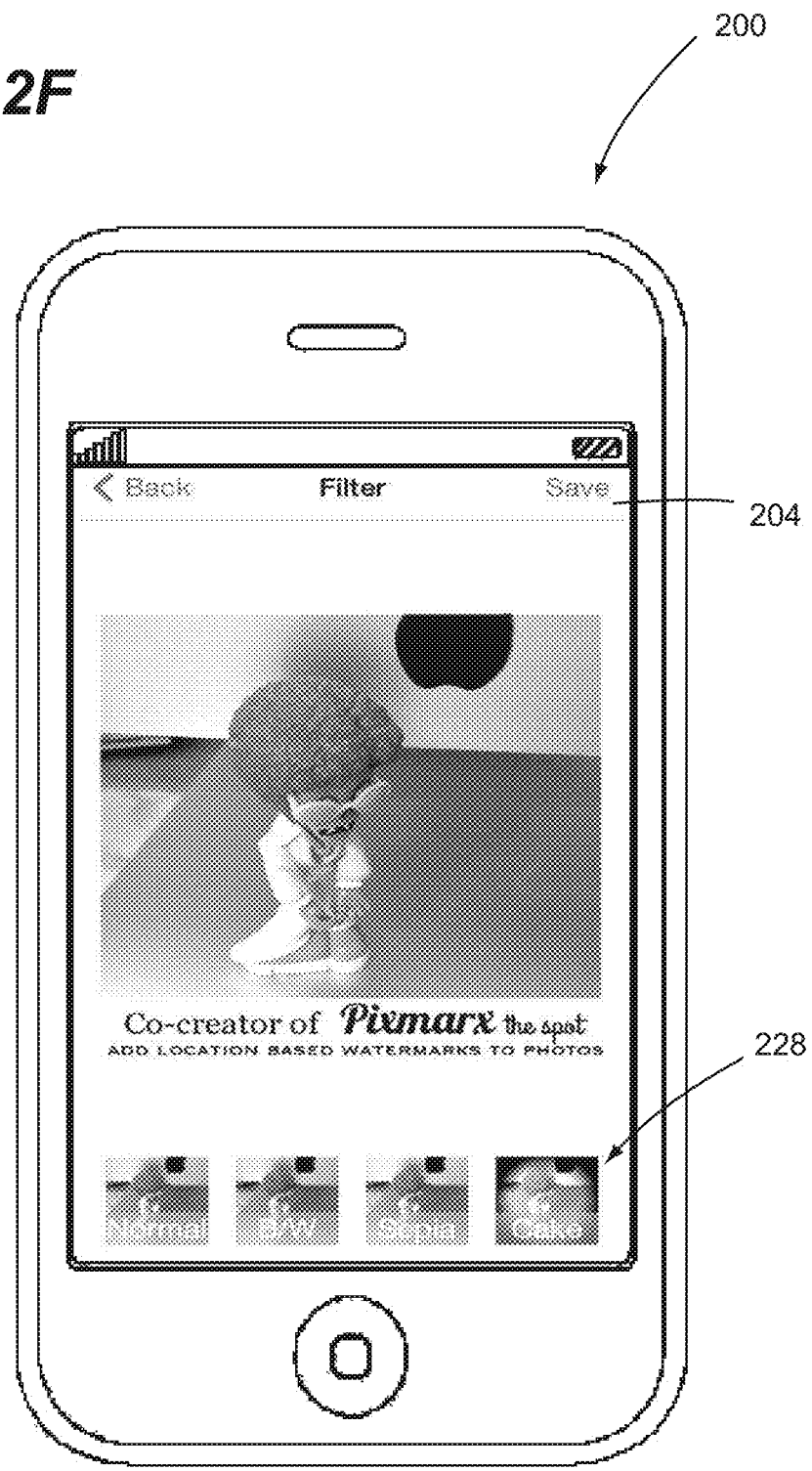
Figure 2G:
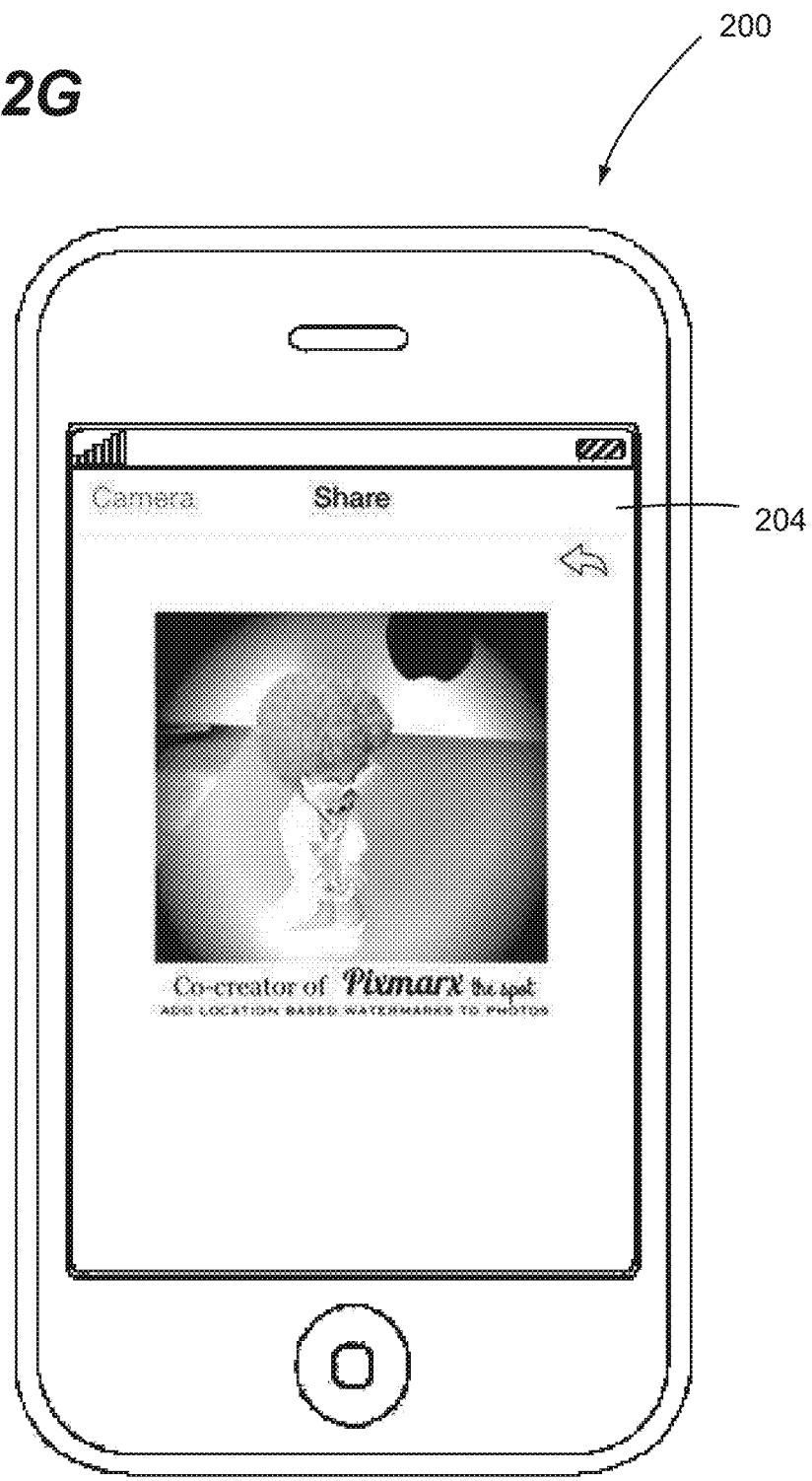

After capturing viewed visual content, an operation 128 can be performed for offering an option of applying a filter to the photographic image. As shown in FIG. 2F, such offering of the application of a filter can include displaying a plurality of as-filtered image examples 228 on the visual display 204 of the smartphone 200. Each one of the as-filtered image examples 228 depicts a respective filter effect as applied to the photographic image. A particular one of the as-filtered image examples 228 can be clicked on for causing the corresponding filter effect to be applied to the photographic image. In response to selection of the particular one of the as-filtered image examples 228, an operation 130 is performed applying the selected filter to the photographic image. As shown in FIG. 2G, the photographic image displayed on the visual display 204 of the smartphone 200 is updated to depict the effect of the filter. As can be seen in FIG. 2G, in preferred embodiments of the present invention, the filter effect is applied to only the captured visual content portion of the photographic image such that the watermark image remains in an unfiltered state. For example, the watermark is in a PNG file format and is displayed in a foreground layer of photographic image and the captured visual content appears in a background layer of photographic image in a JPEG (joint photo experts group) file format. As the user views both layers, the user then can select different electronic camera filters that only change the background layer. In this regard the captured visual content remains the same (i.e., unfiltered).

Figure 2H:
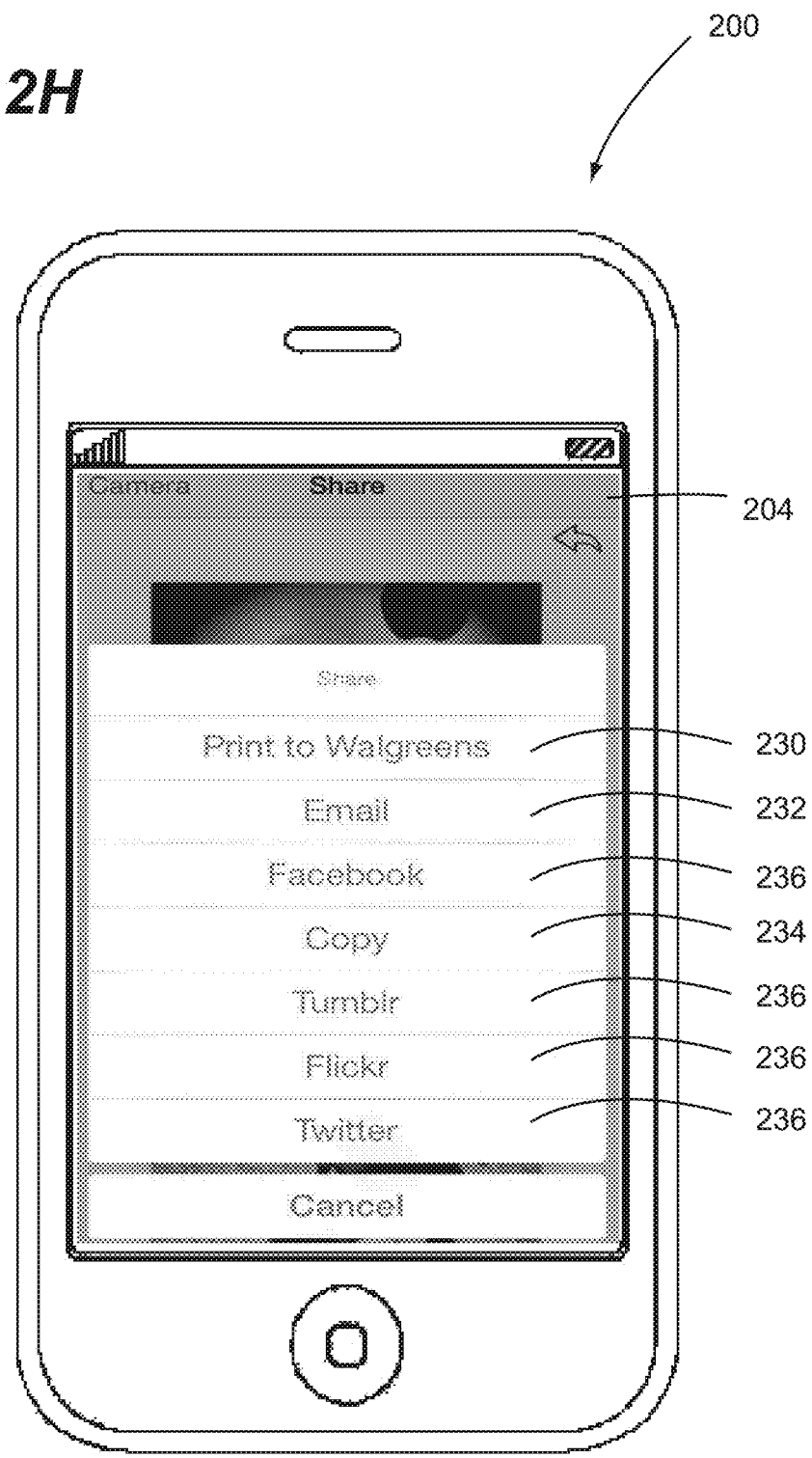

After applying the filter, or when it is requested that the photographic image remain unfiltered, an operation 132 is performed for saving the photographic image. For example, saving the photographic image can include merging an imaging layer having the watermark image with an imaging layer having the captured visual content. In response to or in combination with saving the photographic image, an operation 134 is performed for offering an ability to share the photographic image. In response to the offer to share the photographic image being declined, the method 100 ends. Otherwise, an operation 136 is performed for displaying options for sharing the photographic image. For example, as shown in FIG. 2H, displayed options for sharing the photo can include a selection 230 for printing the photographic image, a selection 232 for emailing the photographic image, a selection 234 for copying the photographic image, and one or more selections 236 for providing the photographic image to a social media account. In response to an operation 138 being performed for receiving a selected sharing option, an operation 140 is performed for implementing sharing of the photographic image in accordance with the selected sharing option.

In the case of selected sharing option being providing the photographic image to a social media account, sharing of the photographic image can also include sharing a social media content identifier associated with the watermark in the photographic image. For example, in the case of a registered watermark, the social media content identifier associated with the watermark in the photographic image can be downloaded along with the registered watermark. Sharing of the social media content identifier includes transmitting the photograph and the social media content identifier for reception by a social media system, which provides a convenient means for allowing the photographic image to be subsequently utilized by the social media system (e.g., shared and/or tracked using the social media system).

Figure 5:
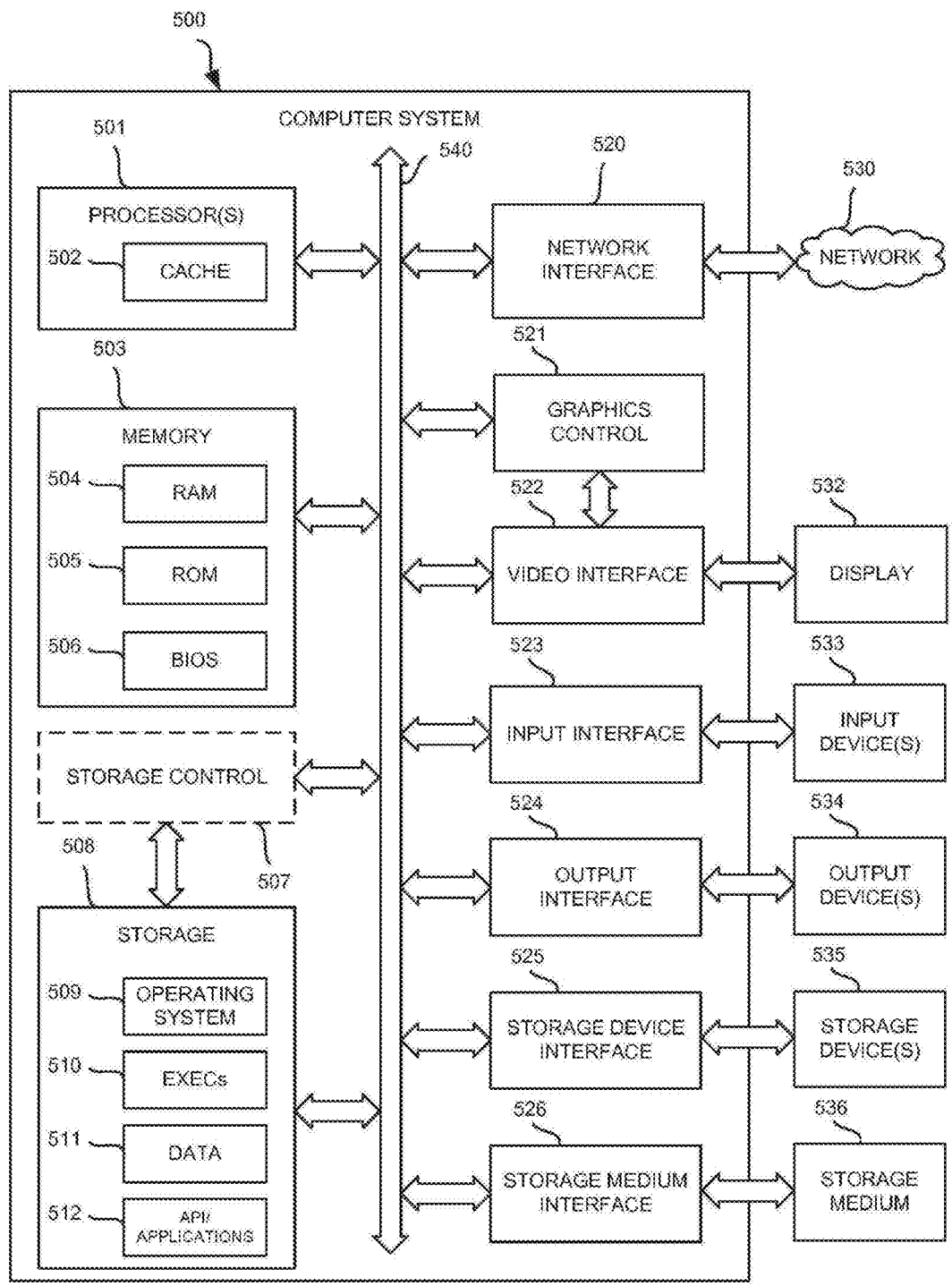
FIG. 5 is a diagrammatic view of a computer system configured in accordance with an embodiment of the present invention.

Turning now to a discussion of approaches for implementing embodiments of the present invention, systems and methods (e.g., the method 100 disclosed above in reference to FIGS. 1a and 1B) in accordance with embodiments of the present invention can be implemented in any number of different types of data processing systems (e.g., a computer system) in addition to the specific physical implementation of a data processing system in the form of a smart phone. To this end, FIG. 5 shows a diagrammatic representation of one embodiment of a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

The computer system 500 can include a processor 501, a memory 503, and a storage 508 that communicate with each other, and with other components, via a bus 540. The bus 540 can also link a display 532, one or more input devices 533 (which can, for example, include a keypad, a keyboard, a mouse, a stylus, etc.), one or more output devices 534, one or more storage devices 535, and various tangible storage media 536. All of these elements can interface directly or via one or more interfaces or adaptors to the bus 540. For instance, the various tangible storage media 536 can interface with the bus 540 via storage medium interface 526. Computer system 500 can have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. All or a portion of the elements 501-536 can be housed in a single unit (e.g., a cell phone housing, a tablet housing, or the like).

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 can provide functionality as a result of the processor(s) 501 executing software embodied in one or more tangible computer-readable storage media, such as memory 503, storage 508, storage devices 535, and/or storage medium 536. The computer-readable media can store software that implements particular embodiments, and processor(s) 501 can execute the software. Memory 503 can read the software from one or more other computer-readable media (such as mass storage device(s) 535, 536) or from one or more other sources through a suitable interface, such as network interface 520. The software can cause processor(s) 501 to carry out one or more processes or one or more steps of one or more processes described or illustrated herein. Carrying out such processes or steps can include defining data structures stored in memory 503 and modifying the data structures as directed by the software.

The memory 503 can include various components (e.g., machine readable media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 can act to communicate data and instructions unidirectionally to processor(s) 501, and RAM 504 can act to communicate data and instructions bidirectionally with processor(s) 501. ROM 505 and RAM 504 can include any suitable tangible computer-readable media described below. In one example, a basic input/output system 506 (BIOS), including basic routines that help to transfer information between elements within computer system 500, such as during start-up, can be stored in the memory 503.

Fixed storage 508 is connected bidirectionally to processor(s) 501, optionally through storage control unit 507. Fixed storage 508 provides additional data storage capacity and can also include any suitable tangible computer-readable media described herein. Storage 508 can be used to store operating system 509, EXECs 510 (executables), data 511, APV applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 can, in appropriate cases, be incorporated as virtual memory in memory 503.

In one example, storage device(s) 535 can be removably interfaced with computer system 500 (e.g., via an external port connector (not shown)) via a storage device interface 525. Particularly, storage device(s) 535 and an associated machine-readable medium can provide nonvolatile and/or volatile storage of machine-readable instructions, data structures, program modules, and/or other data for the computer system 500. In one example, software can reside, completely or partially, within a machine-readable medium on storage device(s) 535. In another example, software can reside, completely or partially, within processor(s) 501.

Bus 540 connects a wide variety of subsystems. Herein, reference to a bus can encompass one or more digital signal lines serving a common function, where appropriate. Bus 540 can be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 can also include an input device 533. In one example, a user of computer system 500 can enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 can be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 can communicate with other devices, specifically mobile devices and enterprise systems, connected to network 530. Communications to and from computer system 500 can be sent through network interface 520. For example, network interface 520 can receive incoming communications (such as requests or responses from other devices) in the form of one or more packets (such as Internet Protocol (IP) packets) from network 530, and computer system 500 can store the incoming communications in memory 503 for processing. Computer system 500 can similarly store outgoing communications (such as requests or responses to other devices) in the form of one or more packets in memory 503 and communicated to network 530 from network interface 520. Processor(s) 501 can access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, can employ a wired and/or a wireless mode of communication. In general, any network topology can be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 can include one or more other peripheral output devices 534 including, but not limited to, an audio speaker, a printer, and any combinations thereof. Such peripheral output devices can be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 can provide functionality as a result of logic hardwired or otherwise embodied in a circuit, which can operate in place of or together with software to execute one or more processes or one or more steps of one or more processes described or illustrated herein. Reference to software in this disclosure can encompass logic, and reference to logic can encompass software. Moreover, reference to a computer-readable medium (also sometimes referred to as machine-readable medium" can encompass a circuit (such as an IC) storing software for execution, a circuit embodying logic for execution, or both, where appropriate. The present disclosure encompasses any suitable combination of hardware, software, or both.

The term "computer-readable medium" should be understood to include any structure that participates in providing data that can be read by an element of a computer system. Such a medium can take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Those of skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

The previous description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

Although the present invention has been described with reference to several exemplary embodiments, it is understood that the words that have been used are words of description and illustration, rather than words of limitation. Changes can be made within the purview of the appended claims, as presently stated and as amended, without departing from the scope and spirit of the present invention in all its aspects. Although the present invention has been described with reference to particular means, materials and embodiments, the present invention is not intended to be limited to the particulars disclosed; rather, the present invention extends to all functionally equivalent technologies, structures, methods and uses such as are within the scope of the appended claims.

What is claimed is:

1. A computer-implemented method performed by a wireless communication device, comprising:

receiving a request to embed system-provided content into a photograph to be taken at a current location of the wireless communication device using a digital imaging device of the wireless communication device;

receiving one or more embeddable content images responsive to the receipt of the request to embed;

selecting one of the one or more of the one or more embeddable content images;

displaying the selected one or more embeddable content images on an image viewing structure of the wireless communication device;

displaying visual content captured in real-time by the digital imaging device on the image viewing structure in combination with the selected one or more embeddable content images, wherein displaying the selected one or more embeddable content images comprises maintaining the selected embeddable content image within an area of the image viewing structure independent of the visual content that is being captured in real-time by the digital imaging device such that the selected one or more embeddable content images remains displayed on the image viewing structure irrespective of the visual content being captured by the digital imaging device, and wherein the selected one or more embeddable content images are displayed as a mask over the visual content that is being captured in real-time by the digital imaging device; and outputting from the wireless communication device a visual image data structure comprising a photograph, wherein the photograph comprises the selected one or more embeddable content images and portions of said captured real-time visual content that are visible on the image viewing structure through the mask.

2. A computer-implemented method performed by a wireless communication device, said wireless communication device including a digital imaging device and image viewing structure, said method comprising:

receiving a request to embed a system-provided embeddable content image with an image to be captured by said digital imaging device at a location of said wireless communication device;

receiving an embeddable content image responsive to said receiving a request to embed;

displaying in an area of said image viewing structure said embeddable content image;

maintaining said embeddable content image in a static position in said area of said image viewing structure; and displaying in combination in said image viewing structure a combined visual image comprising:
 a captured image provided from said digital imaging device in real time at the location;
 said embeddable content image displayed as a mask over said captured image.

3. The computer implemented of claim 2, further comprising:
in said displaying, selectively positioning said captured image relative to said embeddable content image.

4. The computer implemented of claim 3, further comprising:
in said displaying, said captured image selectively positioned relative to said embeddable content image by said digital imaging device framing said captured image when said captured image is taken.

5. The computer implemented of claim 2, further comprising:

in said displaying, said embeddable content image maintained in said static position without reference to visual content of said captured image.

6. The computer implemented of claim 2, further comprising:
generating a digital file comprising said combined visual image.

7. The computer implemented of claim 6, further comprising:
said combined visual image comprising said embeddable content image and a portion of said captured image visible in the image viewing structure through the mask.

8. The computer implemented of claim 2, further comprising:
selecting the embeddable content image from a plurality of embeddable content images received responsive to said receiving a request to embed.

9. A computer-implemented method performed by a wireless communication device having a digital imaging device and image viewing structure, said method comprising:
displaying in combination in said image viewing structure a combined visual image comprising:
 a captured image provided from said digital imaging device in real time at a location of taking a photograph;
 an embeddable content image provided by said wireless communication device, said embeddable content image displayed as a mask over said captured image, said embeddable content image maintained in a static position in said image viewing structure during the taking of the photograph;
and
generating a digital file comprising said combined visual image including said embeddable content image maintained in the static position in said image viewing structure in combination with said captured image as displayed in said image viewing structure during taking of the photograph.

10. A computer-implemented method performed by a wireless communication device, having a digital imaging device and image viewing structure, said method comprising:
receiving, by said wireless communication device, an embeddable content image;
maintaining said embeddable content image in a static position in said image viewing structure when taking a captured image by the digital imaging device;
displaying in combination in said image viewing structure a combined visual image comprising:
 said embeddable content image in said static position displayed as a mask over said captured image;
 said captured image provided from said digital imaging device in real time when taken by the digital imaging device, the captured image selectively positioned relative to said embeddable content image;
and
generating a digital file comprising said combined visual image comprising in combination said embeddable content image in said static position in said image viewing structure displayed as a mask over said captured image, as displayed in said image viewing structure during taking of said captured image by the digital imaging device.

11. The computer-implemented method of claim 10, further comprising:

in said displaying, said embeddable content image maintained in said static position in said image viewing structure without reference to visual content of said captured image.

12. The computer-implemented method of claim 10, further comprising:

said embeddable content image provided by said wireless communication device in relation to a location of said wireless communication device where the captured image is to be taken by said digital imaging device.

13. The computer-implemented method of claim 10, further comprising:

said embeddable content image received by said wireless communication device in relation to the location of said wireless communication device when the captured image is taken by said digital imaging device.

14. The computer-implemented method of claim 10, further comprising:

said embedded content image selected from a plurality of embedded content images provided by said wireless communication device.

15. The computer-implemented method of claim 10, further comprising:

said embeddable content image selected from a plurality of embeddable content images received by said wireless communication device in relation to the location of said wireless communication device when taking the captured image.

16. The computer-implemented method of claim 10, further comprising:

the embeddable content image displayed as a mask over said captured image filtering a portion of said captured image visible in said combined visual image.

* * * * *